April 8, 1969   F. M. BENNETT   3,438,036
SYNTHETIC DOPPLER ANTENNA SYSTEM FOR DIRECTION FINDING
Filed July 27, 1967

3,438,036
SYNTHETIC DOPPLER ANTENNA SYSTEM
FOR DIRECTION FINDING
Floyd M. Bennett, New York, N.Y., assignor to Loral
Corporation, Scarsdale, N.Y., a corporation of Delaware
Filed July 27, 1967, Ser. No. 656,454
Int. Cl. G01s 5/02
U.S. Cl. 343—113                 3 Claims

ABSTRACT OF THE DISCLOSURE

An antenna system for obtaining bearing information from an intercepted electromagnetic signal based upon creating a Doppler shift in the signal frequency by scattering the signal from a moving conductor or its equivalent in the vicinity of the receiver. The magnitude of the shift is a function of the radial velocity of the moving conductor, and hence a function of bearing angle.

---

This invention relates generally to the field of direction finding by determining the direction of a received electromatic signal, and more particularly to an improved means for locating non-cooperating radar transmitting stations.

It is among the principal objects of the present invention to provide an improved bearing determining means suitable for both aircraft and ground use in the passive determination of location of radar transmitting stations.

Another object of the invention lies in the provision of an improved passive ranging device of the class described capable of operating upon the reception of relatively minimal signals.

A further object of the invention lies in the provision of an improved passive ranging device which may be of relatively small overall configuration, and which may be conveniently installed within an aircraft without the need of complex antenna systems which project outwardly of the aircraft.

A further object of the invention lies in the provision of an improved passive ranging device in which the moving parts thereof are of relatively minor complexity, and which may be conveniently serviced in the field.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Before entering into a desired consideration of the structural aspects of the disclosed embodiment, a brief discussion of the theory of operation involved is apposite.

In the field of passive ranging, the present state of the art has reached a high degree of sophistication, and includes techniques such as waveform correlators to determine time of arrival, phase comparators to extract relative bearing, multi-element, multi-station systems which act cooperatively to obtain directional fixes, and computer based integrated systems that perform complex data processing routines to extract positional information. However, the limitations of these systems becomes apparent when examined in a tactical situation in which many signals are present, and in which location fixes must be derived from a single short pulse train, if not from a single pulse, in order to be valuable. The critical measurement appears to be that of bearing, the accuracy obtainable in prior art devices being of an order which leaves much to be desired.

It may be stated categorically that two measurements must be made in order to locate a radar emitter, that is to say, given a full analysis of a radar pulse (amplitude, frequency, power level, and direction of arrival), at least one more parametric measurement must be made to locate the emitter.

The practical possibilities are limited. Aside from power gradient measurements, prior art systems rely upon triangulation of some type, which implies (in the case of aircraft) flying a base leg, and subsequently taking a second set of relatively independent measurements. This is true, whether working in the time domain or the frequency domain. Power gradient measurements in general are inaccurate, since pulse-to-pulse power changes, and power changes due to spatial inhomogeneities are greater than the theoretical $1/R^2$ change in power level for reasonable range changes. Triangulation is therefore the only practical means of passive emitter location, and therefore, refining of bearing measurements is the keystone of the location-range problem.

Figure 1:
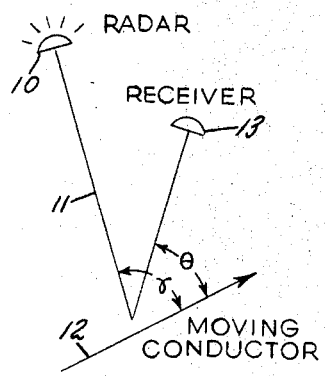
FIGURE 1 is a schematic view showing the principal of operation of the disclosed embodiment.

Referring to FIGURE 1 in the drawing, there is illustrated schematically a radar station 10 emitting a radar beam 11 which is received upon a moving conductor 12, and reflected therefrom to a radar receiver 13.

If the frequency of the radar is $f_o$, and the radius vector is at an angle of $\gamma$ to the moving conductor, the conductor will see a frequency shifted from $f_o$ to $f_s$, where $$f_s = f_o \frac{[C + V \cos \gamma]}{C}$$

Where V is the velocity of the conductor, and C is a constant.

It will re-mit at that frequency ($f_s$) which will be further shifted to $f_r$ when seen at the receiver, where $$f_r = f_s \left[ \frac{C + V \cos \theta}{C} \right]$$

writing $f_r$ in terms of radar frequency, $$f_r = f_o \left[ \frac{C + V \cos \gamma}{C} \right] \left[ \frac{C + V \cos \theta}{C} \right]$$

The difference between $f_o$ and $f_r$ is $f_d$, $$f_d = f_o \left[ \frac{V(\cos \gamma + \cos \theta)}{C} + \frac{V^2 \cos \gamma \cos \theta}{C} \right]$$

Appreciating that the second termn in the bracketed quantity is approximately $10^{-9}$ times the first term, the second term may be neglected, and $$f_d \cong f_o \left[ \frac{V(\cos \gamma + \cos \theta)}{C} \right]$$

Solving for $\gamma$ yields $$\gamma = \cos^{-1} \left[ \frac{f_d}{f_o} \cdot \frac{C}{V} - \cos \theta \right]$$

where $\gamma$ is the bearing to the radar from the moving conductor.

Figure 2:
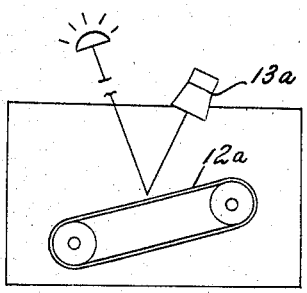
FIGURE 2 is a schematic view showing an embodiment of the invention.

Referring to FIGURE 2 in the drawing, if the moving conductor can be made to recirculate in the vicinity of the receiver, there is present the means of making all necessary measurements. V of the above equation is the surface speed of the moving belt 12a. $\theta$ is the angle of a receiving horn 13a to the belt. $\gamma$, $f_d$ and $f_o$ are the only unknowns in the above expression.

If the same horn 13a can receive the signal directly, the signal can be split (one part of the same to be beat against the reflected signal, and the other to be measured for frequency). When the beat frequency is measured, all the means for calculating $\gamma$ are at hand.

The error expression can be derived by taking the total partial derivative of the governing equation, i.e:

$$\delta\gamma = \frac{\delta\gamma}{\delta f_o}\delta f_o + \frac{\delta\gamma}{\delta f_d}\delta f_d + \frac{\delta\gamma}{\delta V}\delta V$$

allowing $$Z = \left[\frac{f_d}{f_o}\frac{C}{V} - \cos\theta\right]$$

$$\Delta\gamma = \frac{-1}{(1-Z)1/2}\frac{C}{V}\left[\frac{\delta f_d}{f_o} \pm \frac{f_d}{f_o^2}2\delta f_o \pm \frac{f_d}{f_o V}\delta V\right]$$

Evaluating this expression with a set of reasonable parameters such as:

$f_o$=10 gHz.±20 mHz.
$f_d$=500 Hz.±2 Hz.
$\theta$=30°—not varying
$\gamma$=44°
V=$10^3$ cm./sec.±1.5 cm./sec.

yields a typical maximum error in $\gamma$ of 0.83° which, if the error is normally distributed, would yield a 50% probability of an accuracy better than 0.4°.

Figure 3:
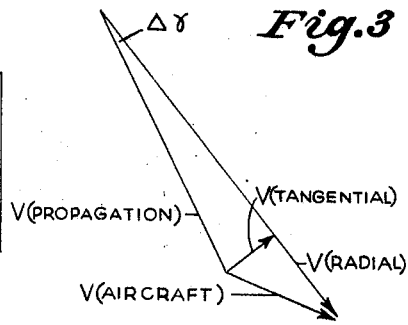
FIGURE 3 is a vector diagram showing certain operational functional relationships characteristic to the disclosed embodiment.

Referring to FIGURE 3 in the drawing, it becomes apparent that an aircraft carrying an embodiment of the invention would create its own Doppler shift in the signal from the radar transmitted signal $f_o$. This shift will not affect bearing calculations, since the system does not depend upon the frequency of the radar, but rather the direction of propagation. The aircraft velocity will cause an apparent shift in this direction of magnitude $$\Delta\gamma = \tan-1\frac{V_a \text{ tangential}}{C}$$

i.e. of the order of 10 microradians for an attack aircraft. This is three orders of magnitude less than the expected error in bearing. Thus, as far as the system is concerned, there is no measurable difference between airborne and ground based bearing calculations.

Figure 4:
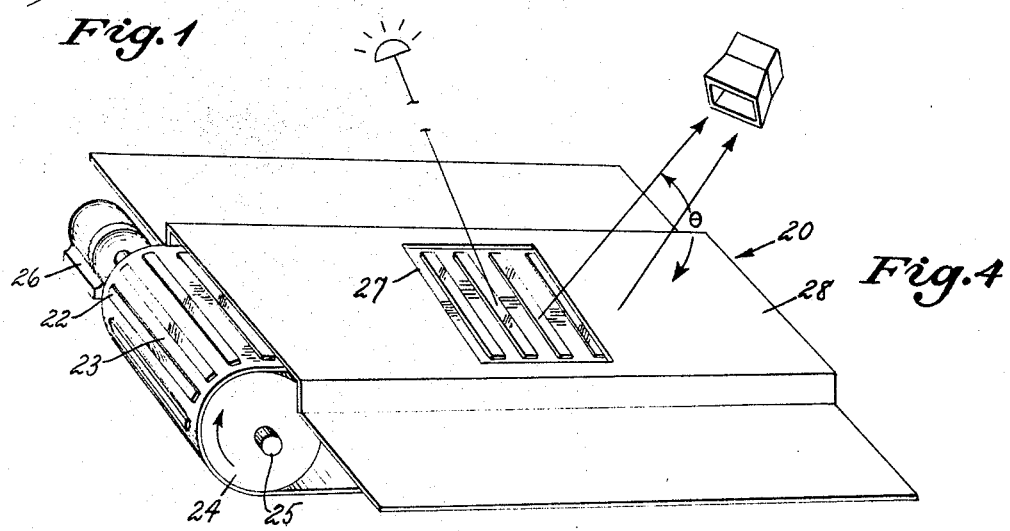
FIGURE 4 is a view in perspective showing the mechanical elements comprising the disclosed embodiment.

With the foregoing discussion in mind, reference may now be made to FIGURE 4 in the drawing, wherein there is illustrated a working embodiment of the invention, generally indicated by reference character 20.

The device includes a metalized Mylar belt 21 which is suitably scribed or etched, as at 22, to produce discontinuities or interstices 23, and to shape the conducting elements. The belt 21 is mounted on a pair of pulleys, one of which is indicated by reference character 24, each having a corresponding shaft 25, one of the shafts being driven by a synchronous motor 26. The pulleys 24 include means to prevent slippage between the belt and the outer surface thereof, to insure tracking, and eliminate belt slip. Tachometer means (not shown) is attached to the shaft 25 to give an accurate measurement of belt velocity.

The belt 21 travels over a high dielectric platen to further enhance back scattering, and to assure flatness as it goes past a window 27 in a covering frame 28. The frame 28 is preferably made of metal, and serves to limit the aperture of the moving reflector window 27, and to provide a reflector for the incident energy at the non-shifted frequency. Thus, the frame 28 and belt 21 lie substantially in the same plane and have a common principal axis orthogonal to said plane. It may be provided with radar absorbers, of well known type, if required, to attenuate non-shifted energy to a point where it approximately matches the signal amplitude from the moving reflector.

The radar receiver typically includes an X-band horn, mounted as seen in FIGURE 4 approximately 10 inches away from the reflector. Although a conventional horn may be used, a horn equipped with a dielectric lens, of type well known in the art, will afford superior performance. Such a lens will have the effect of beam narrowing such that the horn may be placed closer to the surface to achieve a gain increase of approximately 10 db without excessive spectrum spread.

Figure 5:
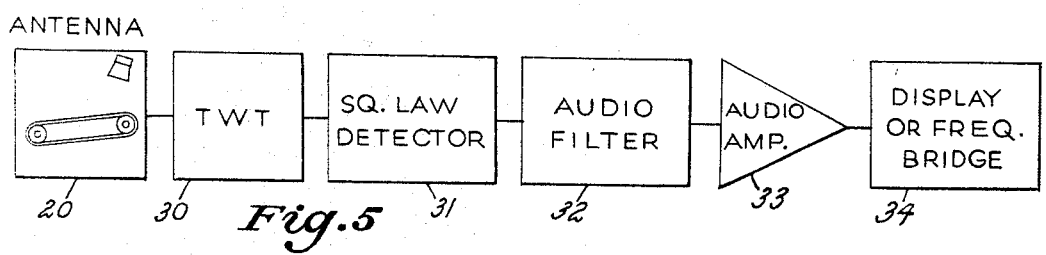
FIGURE 5 is a block diagram of the electronic components comprising the embodiment.

Referring to FIGURE 5, the signal received by the horn will be the original $f_o$ and a Doppler shifted $f_1$. With amplitude adjustment, as described above, the signal will be $A(f_1)+A(f_o)$. This signal is amplified in a traveling wave tube amplifier 30, the output of which is fed to a square law detector 31. The resultant signal is filtered through an audio pass filter 32, further amplified at 33 and displayed on a cathode ray tube 34 as the beat frequency of $A(f_1)$ with $A(f_o)$.

Figure 6:
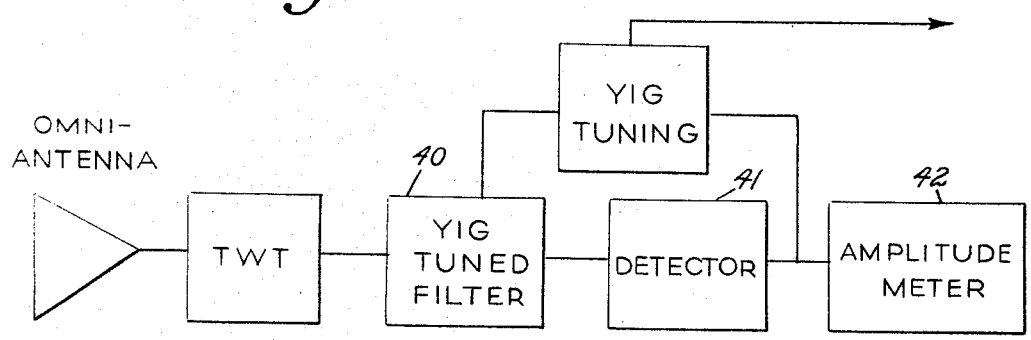
FIGURE 6 is a block diagram of an alternate form of the electronic components thereof.

In the modification illustrated in FIGURE 6, a second channel may be provided to measure the frequency of the source, wherein the output of the traveling wave tube amplifier is fed to a yig-tuned filter 40 a detector 41 and an amplitude meter 42.

I wish it to be understood that I do not consider the invention limited to the precise details of structure shown and set forth in this specification, for obvious modifications will occur to those skilled in the art to which the invention pertains.

I claim:
1. In a direction finding antenna system for use in detecting radar signals, first reflective means for reflecting a signal at the transmitted frequency, second reflective means incorporating frequency shifting means for altering said signal in dependence on the angle of incidence of said transmitted frequency, said first and second means lying in substantially the same plane and having a common principal axis orthogonal to the plane of the reflective means, means disposed at fixed angular relation to said axis for receiving said signals at transmitted frequency and at shifted frequency, and determining the angle of incidence between the received signal and said common axis in terms of the differential frequency existing between the transmitted and shifted signal.

2. Structure in accordance with claim 1, said second means including a moving belt driven at predetermined velocity and having a plurality of reflective and non-reflective areas thereon arranged in predetermined pattern.

3. The method of determining the angle of incidence of an electromagnetic signal upon a predetermined plane with respect to said plane comprising:
 (a) receiving said signal with a receiving antenna in proximity to a reflective surface at a fixed angular relation with respect to said plane;
 (b) producing a Doppler shift, on a portion of said signal by moving a second reflective surface at a predetermined speed in said plane;
 (c) measuring the Doppler shift; and
 (d) determining the angle of incidence of said signal utilizing the parameters:
  (1) angle of the receiving antenna with respect to the plane
  (2) speed of second reflective surface
  (3) measured Doppler shift.

References Cited

UNITED STATES PATENTS 2,405,281  8/1946  Bemis _____ 343—100 X
2,917,740  12/1959  Ramsay.

RICHARD A. FARLEY, *Primary Examiner.*

R. E. BERGER, *Assistant Examiner.*